United States Patent
Blease et al.

(10) Patent No.: US 11,060,028 B2
(45) Date of Patent: Jul. 13, 2021

(54) SOIL TREATMENT

(71) Applicant: Croda International Plc, East Yorkshire (GB)

(72) Inventors: Trevor Graham Blease, Cleveland (GB); Alun Barnes, Goole (GB)

(73) Assignee: Croda International PLC

( * ) Notice: Subject to any disclaimer, the term of this patent is extended or adjusted under 35 U.S.C. 154(b) by 231 days.

(21) Appl. No.: 16/211,394

(22) Filed: Dec. 6, 2018

(65) Prior Publication Data

US 2019/0106625 A1  Apr. 11, 2019

Related U.S. Application Data

(62) Division of application No. 14/787,951, filed as application No. PCT/GB2014/051388 on May 6, 2014, now Pat. No. 10,196,567.

(30) Foreign Application Priority Data

May 8, 2013  (GB) ..................... 1308244

(51) Int. Cl.
*C09K 17/32* (2006.01)
*C09K 17/18* (2006.01)

(52) U.S. Cl.
CPC .............. *C09K 17/32* (2013.01); *C09K 17/18* (2013.01)

(58) Field of Classification Search
CPC .................................................. C09K 17/32
See application file for complete search history.

(56) References Cited

U.S. PATENT DOCUMENTS

| | | | | |
|---|---|---|---|---|
| 3,810,749 A | * | 5/1974 | Young | A01N 25/16 504/162 |
| 5,464,874 A | * | 11/1995 | Balzer | A61K 8/463 514/777 |
| 5,616,548 A | * | 4/1997 | Thomas | C11D 1/37 510/242 |
| 6,851,219 B2 | | 2/2005 | Kostka et al. | |
| 6,969,750 B2 | | 11/2005 | Tanaka et al. | |
| 7,541,386 B2 | | 6/2009 | Kostka et al. | |
| 2003/0073583 A1 | | 4/2003 | Kostka et al. | |
| 2003/0115793 A1 | | 6/2003 | Kostka et al. | |
| 2005/0271595 A1 | * | 12/2005 | Brown | C11D 17/0013 424/10.1 |
| 2007/0065391 A1 | | 3/2007 | Klumpe et al. | |
| 2007/0085055 A1 | | 4/2007 | Sikes et al. | |
| 2008/0172937 A1 | | 7/2008 | Palmer et al. | |
| 2009/0242833 A1 | | 10/2009 | Chen et al. | |
| 2010/0267554 A1 | | 10/2010 | Madsen et al. | |
| 2011/0175026 A1 | | 7/2011 | Bially | |
| 2013/0145805 A1 | | 6/2013 | Olson et al. | |

FOREIGN PATENT DOCUMENTS

| | | |
|---|---|---|
| CN | 1386122 A | 12/2002 |
| EP | 1152024 A1 | 11/2001 |
| EP | 1442097 B1 | 9/2008 |
| EP | 1442096 B1 | 8/2009 |
| JP | 2002187903 A | 7/2002 |
| SU | 1569336 A1 | 6/1990 |
| WO | 9634078 A1 | 10/1996 |
| WO | 0034416 A1 | 6/2000 |
| WO | 2011086117 A1 | 7/2011 |

OTHER PUBLICATIONS

Chinese Office Action for Chinese Application No. 201480025633.6, dated Jan. 4, 2018—16 pages.
European Communication for European Application No. 14 724 139.2, dated Jul. 11, 2018—2 pages.
International Search Report and Written Opinion for International Application No. PCT/GB2014/051388, dated Sep. 11, 2014—18 pages.
Russian Office Action for Russian Application No. 2015152206.05(080464), dated Feb. 6, 2018, including English translation—8 pages.
Russian Search Report for Russian Application No. 2015152206.05(080464), dated Jan. 22, 2018, including English translation—5 pages.
"Technical Bulletin M2127", May 26, 2006, retrieved from the internet: https://web.archive.org/web/20060526163809/http://www.forestry-suppliers.com/t01_pages/pdfs/M2127.pdf [retrieved on Jul. 16, 2014]—3 pages.
Entire patent prosecution history of U.S. Appl. No. 14/787,951, filed Oct. 29, 2015, entitled "Soil Treatment."

\* cited by examiner

*Primary Examiner* — Peter F Godenschwager
(74) *Attorney, Agent, or Firm* — RatnerPrestia

(57) ABSTRACT

A method for wetting and/or conditioning soil comprises applying a soil treatment composition containing hydrolysed protein to the soil. The soil treatment composition preferably contains a surfactant selected from ethylene oxide-propylene oxide (EO/PO) block copolymer and/or an alkyl polyglycoside. The soil treatment composition may also contain an additional alkoxylate surfactant.

10 Claims, No Drawings

SOIL TREATMENT

This application is a divisional application of U.S. patent application Ser. No. 14/787,951, filed 29 Oct. 2015, which is the National Stage filing of International Appln. No. PCT/GB2014/051388, filed 6 May 2014, and claims priority of GB Appln. No. 1308244.1, filed 8 May 2013, the entirety of which applications is incorporated herein by reference for all purposes.

FIELD OF INVENTION

The present invention relates to a method of soil wetting and to a soil treatment composition, in particular to a soil wetting and conditioning treatment, for use in improving the filtration of water and/or aqueous compositions through water repellent soil and for conditioning a surface, such as for example soil.

BACKGROUND

Water repellency is a naturally occurring phenomenon which affects all soils and can lead to the development of dry areas which are often impervious to water. Changes in the surface chemistry of the soil inhibit and/or prevent the soil from being hydrated. Water repellent soil (or hydrophobic soil) does not wet up spontaneously when contacted with water. When the soil becomes dehydrated, the hydrophobic surface of the soil is exposed to the air/water in the pores of the soil. The hydrophobic surfaces prevent water from spreading over the soil particles. This is a particularly noticeable problem on, for example, golf courses where the water repellency of the soil may result in the appearance of dry areas in the turf.

Soil surfactants can be applied to greens, tees and fairways to alleviate soil water repellency, reduce preferential flow, retain soil moisture, reduce runoff and reduce water consumption on golf courses. Conventional soil surfactants for improving water retention of the soil include alkyl phenol ethoxylates, alkyl polyglycosides (APGs) and ethylene oxide-propylene oxide (EO/PO) block copolymers.

There is however a need for a surface treatment composition having improved water wetting ability, water retention and/or uptake ability, and/or improved conditioning of the surface, such as for example soil.

SUMMARY OF THE INVENTION

We have discovered a method and a soil treatment composition comprising hydrolysed protein for improving water retention and/or conditioning of soil that overcomes or significantly reduces at least one of the aforementioned problems.

According to a first aspect of the invention, there is provided a method of wetting and/or conditioning soil comprising applying a soil treatment composition comprising a hydrolysed protein to the soil. Preferably, the application of the hydrolysed protein provides a conditioning effect on the soil.

According to a second aspect of the invention, there is provided a soil treatment composition for wetting and/or conditioning soil comprising a hydrolysed protein, at least one surfactant and water.

According to a third aspect of the invention, there is provided a soil treatment composition concentrate comprising;

(a) (i) 6 to 13 wt. % of hydrolysed protein, (ii) 2 to 10 wt. of (EO/PO) block copolymer,
(iii) 2 to 10 wt. % of ethoxylated glyceride esters, and/or (iv) 65 to 90 wt. % of water, or
(b) (i) 1 to 4 wt. %, of hydrolysed protein, (ii) 5 to 18 wt. % of (EO/PO) block copolymer,
(iii) 5 to 18 wt. % of fatty acid ethoxylate, and/or (iv) 45 to 85 wt. % of water.

According to a further aspect of the invention, there is provided the use of a soil treatment composition comprising hydrolysed protein for improving the water retention and/or conditioning of soil.

DETAILED DESCRIPTION OF THE INVENTION

The hydrolysed protein and/or the soil treatment composition of the present invention may be used to improve the soil's physical qualities, especially the soil's ability to provide nutrition for plants. The soil treatment composition may be used to improve poor soils which have been damaged by, for example, their poor wetting ability. The soil treatment composition may be used to make poor surfaces more usable and to maintain soils in a peak condition. The soil treatment composition may be used to improve the water wetting ability, the water retention and/or uptake ability, of the surface. The use of the soil treatment composition has been found to significantly enhance the water uptake/wetting rates in water repellent soil. The soil treatment composition may be used on agricultural crops, turf grasses, seeds and in the production of plant growth media. The soil treatment composition may be used on, for example, soil or sand.

The hydrolysed protein present in the soil treatment composition used in the present invention may be derived from either animal or vegetable sources, or by fermentation. Examples of suitable proteins include collagen, elastin, keratin, casein, wheat protein, wheat starch, potato protein, soya protein and/or silk protein. Wheat protein and/or potato protein are particularly preferred, and especially wheat protein.

The term "hydrolysed protein" is used herein to include polypeptides, peptides, amino acids and/or peptones. Polypeptides, peptides and amino acids may, for example, be produced by acid, alkali and/or enzyme hydrolysis, of native proteins. Enzyme hydrolysed proteins are preferred. In one embodiment, hydrolysed wheat proteins are preferred, in particular produced by enzyme hydrolysis. The hydrolysed protein component may also contain starch, for example hydrolysed wheat protein may contain wheat starch.

The hydrolysed protein may also be chemically modified, for example where the protein has been covalently reacted with a functional group, e.g. a silane, a quaternary ammonium compound and/or an acid chloride.

The molecular weight (weight average) of the hydrolysed protein may vary over a wide range, such as for example in the range from 50 Da to 50,000 Da, preferably 100 Da to 5,000 Da, more preferably 150 Da to 1500 Da. In one embodiment, the hydrolysed protein may have an average molecular weight in the range from 500 Da to 2,500 Da, preferably 1,000 Da to 2,000 Da, in particular 1,250 Da to 1,750 Da, for example about 1,500 Da. In a further embodiment, the hydrolysed protein may have an average molecular weight in the range from 50 Da to 250 Da, preferably 100 Da to 200 Da, in particular about 150 Da.

In one embodiment, the individual hydrolysed protein segments may comprise on average in the range from 1.5 to 200, preferably 5 to 100, more preferably 8 to 50, particularly 10 to 25 amino acids. In a further embodiment, the individual hydrolysed protein segments may comprise on average in the range from 1 to 10, preferably 1 to 5, more preferably 1 to 3, particularly 1 to 2 amino acids.

It is preferred that the hydrolysed protein component is capable of forming a solution in water or other suitable solvent or co-solvent (such as alcohol, propylene glycol, glycerine or polyethylene glycol).

The hydrolysed protein is suitably present in the soil treatment composition at a concentration in the range from 10 to 100,000 ppm, preferably 500 to 40,000 ppm, more preferably 1,000 to 30,000 ppm, in particular 1,500 to 20,000 ppm, and especially 2,000 to 10,000 ppm.

A soil treatment composition concentrate may be formed which will generally be diluted prior to applying to the soil. Prior to use, the soil treatment composition concentrate may be suitably diluted, generally with water, in the range from 2 to 1,000, preferably 4 to 100, more preferably 6 to 50, in particular 7 to 15, and especially 8 to 12 fold.

The hydrolysed protein is suitably present in the soil treatment composition concentrate at a concentration in the range from 100 to 850,000 ppm, preferably 5,000 to 400,000 ppm, more preferably 10,000 to 30,000 ppm, in particular 15,000 to 200,000 ppm, and especially 20,000 to 100,000 ppm.

In one embodiment, the soil treatment composition according to, or used in the method of, the present invention further comprises at least one surfactant, preferably a non-ionic surfactant. Preferably the at least one non-ionic surfactant is selected from polyalkylene oxide block copolymer(s) and alkyl polyglycosides (APGs), or a combination thereof.

The polyalkylene oxide block copolymer or alkyl polyglycoside is suitably present in the soil treatment composition at a concentration in the range from 10 to 100,000 ppm, preferably 1,000 to 50,000 ppm, more preferably 3,000 to 30,000 ppm, in particular 5,000 to 20,000 ppm, and especially 6,000 to 15,000 ppm.

The polyalkylene oxide block copolymer or alkyl polyglycoside is suitably present in the soil treatment composition concentrate at a concentration in the range from 100 to 800,000 ppm, preferably 10,000 to 500,000 ppm, more preferably 30,000 to 300,000 ppm, in particular 50,000 to 200,000 ppm, and especially 60,000 to 150,000 ppm.

Preferably, the at least one non-ionic surfactant in the soil treatment composition is a polyalkylene oxide block copolymer. The polyalkylene oxide block copolymer preferably comprises an ethylene oxide-propylene oxide (EO/PO) block copolymer. The ethylene oxide-propylene oxide block copolymers (PEG/PPG) may include straight block polymeric glycols obtained for example by the addition of ethylene oxide on a condensation product of propylene oxide. The ethylene oxide-propylene oxide block copolymers may also include reverse block copolymers formed by the addition of polypropylene oxide on a condensation product of ethylene oxide. The ethylene oxide-propylene oxide block copolymers may be end-capped, e.g. by alkyl groups, preferably C1 to C5 alkyl groups, more preferably methyl.

The polyalkylene oxide block copolymers preferably have an average molecular weight of greater than 1,000, more preferably in the range from 1,500 to 15,000, in particular 2,000 to 5,000, especially 2,200 to 3,000, for example about 2,400. The polyalkylene oxide block copolymers preferably comprise (i) an ethylene oxide content in the range from 5 to 40 wt. %, in particular 10 to 30 wt. %, especially 15 to 25 wt. %, for example about 20 wt. %, and/or (ii) a propylene oxide content in the range from 60 to 95 wt. %, in particular 70 to 90 wt. %, especially 75 to 85 wt. %, for example about 80 wt. %.

Preferably, the ethylene oxide-propylene oxide (EO/PO) block copolymer has the formula $(EO)_x\text{-}(PO)_y\text{-}(EO)_z$ wherein x and z are each independently in the range from 1 to 15, preferably 2 to 10, more preferably 3 to 8, in particular 4 to 7, especially 5 to 6, for example 5.5. x and z may be the same or different. y is preferably in the range from 10 to 50, preferably 20 to 40, in particular 30 to 35, for example 33. Preferably, the ethylene oxide-propylene oxide (EO/PO) block copolymer has the formula $(EO)_{5.5}\text{-}(PO)_{33}\text{-}(EO)_{5.5}$, having an average molecular weight of approximately 2400.

The at least one non-ionic surfactant may be an alkyl polyglycoside (APG). Alkyl polyglycosides are reaction products of sugars and fatty alcohols. Suitable sugar components, for example, include the aldoses and ketoses such as glucose, fructose, mannose, galactose, talose, gulose, allose, altrose, idose, arabinose, xylose, lyxose, lactose, sucrose, maltose, maltotriose, cellobiose, mellobiase and ribose. The lipophilic groups in the alkyl polyglycosides are derived from alcohols.

While the preferred groups are saturated aliphatic or alkyl, there may be present some unsaturated aliphatic hydrocarbon groups. Preferred alkyl polyglycosides are obtained from the reaction of alkanols with glucose or other mono- or di- or polysaccharides, such as for example trisaccharides.

Preferred alkyl polyglycosides comprise a distribution of polyglycosides derived from an acid catalyzed reaction of an alcohol containing between 6 and 20 carbon atoms and a suitable saccharide. The alkyl polyglycoside(s) may comprise a mixture of two or more alkyl polyglycosides. Preferably, the alkyl polyglycoside(s) comprise a $C_6$ to $C_{20}$ alkyl moiety; more preferably a $C_7$ to $C_{15}$ alkyl moiety; in particular a $C_8$ to $C_{12}$ alkyl moiety.

The soil treatment composition according to the present invention preferably comprises a hydrolysed protein and at least one non-ionic surfactant selected from polyalkylene oxide block copolymer(s), alkyl polyglycoside(s), or a combination thereof. Preferably, the polyalkylene oxide block copolymer(s) are ethylene oxide/propylene oxide (EO/PO) block copolymer(s). The soil treatment composition may further comprise at least one other additional surfactant, i.e. not a polyalkylene oxide block copolymer or alkyl polyglycoside. The at least one additional surfactant is preferably also a non-ionic surfactant, more preferably a hydrophobised alkoxylate surfactant.

The additional non-ionic, preferably hydrophobised alkoxylate, surfactant is suitably present in the soil treatment composition at a concentration in the range from 10 to 100,000 ppm, preferably 1,000 to 50,000 ppm, more preferably 3,000 to 30,000 ppm, in particular 5,000 to 20,000 ppm, and especially 6,000 to 15,000 ppm.

The additional non-ionic, preferably hydrophobised alkoxylate, surfactant is suitably present in the soil treatment composition concentrate at a concentration in the range from 100 to 800,000 ppm, preferably 10,000 to 500,000 ppm, more preferably 30,000 to 300,000 ppm, in particular 50,000 to 200,000 ppm, and especially 60,000 to 150,000 ppm.

The preferred hydrophobised alkoxylate surfactant can be derived from natural materials, such as for example fatty acid esters, ethers, hemi-acetals or acetals of polyhydroxylic compounds or a fatty acid amide which is N-substituted with the residue of a polyhydroxylic compound.

The term "hydrophobised alkoxylate surfactant" is used herein to refer to surfactants in which a hydrophobe, usually a hydrocarbyl group, is connected through the residue of a linking group having a reactive hydrogen atom to an oligomeric or polymeric chain of alkylene oxide residues. The hydrocarbyl group is typically a chain, commonly an alkyl chain, containing in the range from 8 to 24, particularly 12 to 22, and usually 14 to 20 carbon atoms. The linking group can be an oxygen atom (hydroxyl group residue); a carboxyl group (fatty acid or ester residue); an amino group (amine group residue); or a carboxyamido (carboxylic amide residue). The linking group may be a polyol, such as sorbitol, glycerine or polyglycerin, preferably glycerin. The alkylene oxide residues are typically residues of ethylene oxide ($C_2H_4O$) or polypropylene oxide ($C_3H_6O$) or combinations of ethylene and propylene oxide residues. Particularly and desirably, substantially all the residues are ethylene oxide residues. The average number of alkylene oxide residues in the surfactant molecule is preferably in the range from 2 to 200, more preferably 4 to 100, particularly 6 to 50, and especially 8 to 35.

Examples of suitable hydrophobised alkoxylate surfactants include alcohol alkoxylates, of the formula (a): $R^1$—O-$(AO)_n$-H; a fatty acid alkoxylate of the formula (b): $R^1$—COO-$(AO)_n$-$R^2$ (plus co-products); a fatty amine alkoxylate of the formula (c): $R^1$—$NR^3$-$(AO)_n$-H; a fatty amide alkoxylate of the formula (d): $R^1$—$NR^3$-$(AO)_n$-H, where each $R^1$ Is independently a $C_8$ to $C_{24}$, particularly $C_{10}$ to $C_{20}$, hydrocarbyl, particularly alkyl group; $R^2$ is a hydrogen atom or a $C_1$ to $C_8$ alkyl group; and each $R^3$ is independently a $C_1$ to $C_6$ alkyl group or a group $(AO)_n$-H; each AO is independently an ethylene oxide or propylene oxide group; and the total of the indice n in the molecule is from 2 to 200.

A further example of suitable hydrophobised alkoxylate surfactants include alkoxylated polyol esters. Suitable polyols include ethylene glycol, propylene glycol, trimethylene glycol, diols of butane, neopentyl glycol, trimethylol propane and its dimer, pentaerythritol and its dimer, inositol, sorbitol, glycerine, diglycerin or polyglycerin, preferably glycerin. The alkoxylated polyol esters may be partial esters, e.g. monoglycerides or diglycerides, or full esters, e.g. triglycerides. The preferred alkoxylated glyceride ester may comprise a medium or long chain glyceride, diglyceride or polyglyceride. A medium chain glyceride has 8 to 10 carbon atoms, whereas a long chain glyceride has 12 or more carbon atoms.

Examples of glyceride esters that can be alkoxylated include those derived from almond oil, borage oil, canola oil, castor oil, coconut oil, coffee seed oil, corn oil, cottonseed oil, grapeseed oil, groundnut oil, hemp seed oil, linseed oil, maize oil, menhaden oil, mustard seed oil, olive oil, palm oil, palm kernel oil, peanut oil, poppy seed oil, rapeseed oil, race bran oil, safflower oil, sesame oil, soyabean oil, sunflower oil, tall oil, wheat germ oil, and castor-wax castor oil. The glyceride esters are preferably derived from plant oils, more preferably from almond oil, cotton seed oil, corn oil, maize oil, olive oil, palm kernel oil, rapeseed oil, soya-bean oil and sunflower oil.

Specific examples of glyceride esters that can be alkoxylated include glyceryl tributyrate, glyceryl tricaproate, glycerol tricaprylate, glyceryl tricaprate, glyceryl triundecanoate, glyceryl trilaurate, glyceryl trimyristate, glyceryl tripalmitate, glyceryl tristearate, glyceryl triarachidate, glycerol trimyristoleate, glyceryl tripalmitoleate, glyceryl trioleate, glyceryl trilinoleate, glyceryl tricaprylate/caprate, glyceryl tricaprylate/caprate/laurate, glyceryl tricaprylate/caprate/linoleate, glyceryl tricaprylate/caprate/stearate, glyceryl tricaprylate/laurate/stearate, glyceryl 1,2-caprylate-3-linoleate, glyceryl 1,2-caprate-3-stearate, glyceryl 1,2-laurate-3-myristate, glyceryl 1,2-myristate-3-laurate, glyceryl 1,2-palmitate-2-butyrate, glyceryl 1,3-stearate-2-caprate, and glyceryl 1,2-linoleate-3-caprylate.

Preferably, the alkoxylate surfactant(s) is selected from fatty acid or fatty alcohol alkoxylates (for example fatty acid or fatty alcohol ethoxylates) and alkoxylated glyceride esters (for example ethoxylated glyceride esters).

The total amount of surfactant, preferably non-ionic surfactant in the soil treatment composition is suitably in the range from 100 to 200,000 ppm, preferably 5,000 to 50,000 ppm, more preferably 1,000 to 40,000 ppm, in particular 10,000 to 30,000 ppm, and especially 12,000 to 25,000 ppm.

The total amount of surfactant, preferably non-ionic surfactant in the soil treatment composition concentrate is suitably in the range from 1000 to 800,000 ppm, preferably 50,000 to 500,000 ppm, more preferably 10,000 to 400,000 ppm, in particular 100,000 to 300,000 ppm, and especially 120,000 to 250,000 ppm.

In one embodiment, the soil treatment composition comprises (i) a hydrolysed protein, (ii) at least one polyalkylene oxide block copolymer(s), and (iii) at least one additional surfactant selected from fatty acid alkoxylates, fatty alcohol alkoxylates and alkoxylated glyceride esters. The at least one polyalkylene oxide block copolymer is preferably an EO/PO block copolymer.

In a further embodiment, the soil treatment composition comprises a hydrolysed protein, at least one EO/PO block copolymer, and at least one fatty acid alkoxylate. Preferably the fatty acid alkoxylate is a fatty acid ethoxylate. The fatty acid ethoxylate may be PEG-9 laurate.

In a further embodiment, the soil treatment composition comprises a hydrolysed protein, at least one EO/PO block copolymer, and at least one alkoxylated glyceride ester. The alkoxylated glyceride ester is preferably selected from alkoxylated almond glycerides and/or alkoxylated capric/caprylic glycerides. Preferably, the at least one alkoxylated glyceride ester is a mixture of ethoxylated (e.g. PEG-60) almond triglyceride and ethoxylated (e.g. PEG-6) capric/caprylic glyceride.

In one embodiment, the soil treatment composition comprises a ratio by weight of the total, preferably non-ionic, surfactant (for example the polyalkylene oxide block copolymer and any additional surfactant) to the hydrolysed protein in the range from 0.3 to 3:1; preferably 0.6 to 1.8:1; more preferably 0.8 to 1.5:1; for example approximately 1.25:1.

In another embodiment, the soil treatment composition comprises a ratio by weight of the total, preferably non-ionic, surfactant (for example the polyalkylene oxide block copolymer and any additional surfactant) to the hydrolysed protein in the range from 2 to 30:1; preferably 5 to 20:1; more preferably 10 to 15:1; for example approximately 12.5:1.

In one preferred embodiment, the soil treatment composition comprises a hydrolysed wheat protein having an average molecular weight of approximately 1500 Da; a (EO)/(PO) block copolymer of the formula $(EO)_{5.5}$-$(PO)_{33}$-$(EO)5.5$ having an average molecular weight of approximately 2400; and ethoxylated glyceride esters comprising PEG-60 triglyceride and PEG-6 capric/caprylic glyceride. The PEG-60 triglyceride may be PEG-60 almond triglyceride. The (EO)/(PO) block copolymer may be present within the soil treatment composition at an approximately equal concentration to the ethoxylated glyceride esters. Preferably in this embodiment, the soil treatment composition comprises a ratio by weight of polyalkylene oxide block copolymer to ethoxylated glyceride esters to hydrolysed protein of 0.5 to 0.8:0.5 to 0.8:1, more preferably 0.6 to 0.7:0.6 to 0.7:1.

As explained herein, a soil treatment composition concentrate may be formed which will generally be diluted prior to applying to the soil. In the above embodiment, the soil treatment composition concentrate comprises (i) in the range from 4 to 17 wt. %, preferably 6 to 13 wt. %, more preferably 8 to 11 wt. %, for example 10 wt. %, of hydrolysed protein, (ii) 1 to 20 wt. %, preferably 2 to 10 wt. %, more preferably 5 to 8 wt. %, in particular 6 to 7 wt. %, for example 6.25 wt. %, of (EO/PO) block copolymer, (iii) 1 to 20 wt. %, preferably 2 to 10 wt. %, more preferably 5 to 8 wt. %, in particular 6 to 7 wt. %, for example 6.25 wt. %, of ethoxylated glyceride esters, and/or (iv) 40 to 93 wt. %, preferably 65 to 90 wt. %, more preferably 70 to 80 wt. %, in particular about 78 wt. %, of water.

In another preferred embodiment, the soil treatment composition comprises a hydrolysed wheat protein having an average molecular weight of approximately 150 Da; a (EO)/(PO) block copolymer having the formula $(EO)_{5.5}$-$(PO)_{33}$-$(EO)_{5.5}$ having an average molecular weight of approximately 2400; and a fatty acid ethoxylate, e.g. PEG-9 laurate.

The (EO)/(PO) block copolymer may be present within the soil treatment composition at an approximately equal concentration to the fatty acid ethoxylate PEG-9 laurate. Preferably, in this embodiment the soil treatment composition comprises a ratio of polyalkylene oxide block copolymer to fatty acid ethoxylate to hydrolysed protein of 3 to 8:3 to 8:1, more preferably 6 to 6.5:6 to 6.5:1.

In this embodiment, the soil treatment composition concentrate comprises (i) in the range from 0.5 to 6 wt. %, preferably 1 to 4 wt. %, more preferably 1.5 to 3 wt. %, for example 2 wt. %, of hydrolysed protein, (ii) 1 to 20 wt. %; preferably 5 to 18 wt. %, more preferably 10 to 15 wt. %, in particular 12 to 13 wt. %, for example 12.5 wt. %, of (EO/PO) block copolymer, (iii) 1 to 20 wt. %, preferably 5 to 18 wt. %, more preferably 10 to 15 wt. %, in particular 12 to 13 wt. %, for example 12.5 wt. %, of fatty acid ethoxylate, and/or (iv) 40 to 93 wt. %, preferably 45 to 85 wt. %, more preferably 55 to 70 wt. %, in particular around 60 wt. %, of water.

The surface treatment compositions of the present invention may be used with one or more of the standard ingredients or carriers. The composition may be provided for use in any suitable form. The soil treatment composition is applied to the surface in the method described herein at an effective concentration. The term "effective concentration" is herein used to mean the concentration of the soil treatment composition applied to soil which is sufficient to provide a measurable increase in the water uptake and/or wetting rate of the soil.

For example, a soil treatment composition comprising (EO)/(PO) block copolymer, ethoxylated triglycerides/glycerides and hydrolysed protein is preferably applied to the soil at an effective concentration of approximately 12,000 ppm, with the hydrolysed protein being applied to the soil at an effective concentration of approximately 10,000 ppm.

A soil treatment composition comprising (EO)/(PO) block copolymer, fatty acid ethoxylate and amino acids (hydrolysed protein) is preferably applied to the soil at an effective concentration of approximately 25,000 ppm, with the amino acids being applied to the soil at an effective concentration approximately 2,000 ppm.

In order that the present invention may be more readily understood, reference will now be made, by way of example, to the following description.

In this specification the following test methods have been used:

1) Molecular Weight of Hydrolysed Protein

Molecular weight (weight average) was determined by size exclusion HPLC using a TSK-GEL G2000SWxl (30 cm×7.8 mm internal diameter) column. Protein standards of known molecular weight were used in the range 75 to 67,000 Daltons.

2) Soil Wetting Efficacy using Capillary Rise Technique (i) Uniform soil plugs were collected from a grassed area using a soil plugger (2" Spotless Plugger) of size 2 inch (diameter)×3 inch (length).

(ii) The plugs were dried at 50° C. for 24 hours.

(iii) The soil plug was placed in a beaker (grass side facing down) containing a solution of 0.2% w/w of the total surfactant.

(iv) The time taken for the solution to be absorbed by the soil was recorded (v) This technique was repeated in triplicate and the mean values were recorded in Tables 1 and 2.

Surfactant 1 is polyalkylene oxide block copolymer $((EO)_{5.5}$-$(PO)_{33}$-$(EO)_{5.5}$; MW ca 2400); Surfactant 2 is PEG-9 laurate; Surfactant 3 is PEG-60 almond triglyceride and PEG-6 capric/caprylic glyceride.

TABLE 1

| | Uptake time (s) | | | | |
|---|---|---|---|---|---|
| Water (control) | Surfactant 1 | Surfactant 2 | Surfactant 3 | Surfactant 1 and Surfactant 2 | Surfactant 1 and Surfactant 3 |
| 2400 | 67.5 | 123.3 | 125.7 | 39.0 | 46.7 |

The results in Table 1 illustrate the synergism of the combination of the EO/PO block copolymers with PEG-9 laurate or PEG-60 almond triglyceride and PEG-6 capric/caprylic glyceride.

The hydrolysed proteins used in the following technique were as follows:

Hydrolysed Protein 1: hydrolysed wheat protein, average weight approximately 1500 Da.

Hydrolysed Protein 2: wheat amino acids, average weight approximately 150 Da. Solutions tested contained 0.2% w/w total surfactant.

TABLE 2

| Hydrolysed Protein | Uptake time (s) | |
|---|---|---|
| level (% w/w) | Surfactant 1; Surfactant 3 and Hydrolysed Protein 1 | Surfactant 1; Surfactant 2 and Hydrolysed Protein 2 |
| 0 | 46.7 | 39.0 |
| 0.4 | 45.3 | 37.7 |

The results show that the presence of the hydrolysed protein does not reduce the wetting ability of surfactants.

3. Moisture Uptake Method (Hydrolysed Protein Only)

(i) Test solutions were prepared in water to give solutions containing 14.5% active solids (no soil present; just hydrolysed protein).

(ii) Samples of the test solutions (approx 2 g) were accurately weighed into a weighing boat.

(iii) The samples were placed in a humidity cabinet (relative humidity of 50%) and left for 24 hours and then re-weighed.

(iv) Alternatively, the samples were placed in a desiccator, containing sulphuric acid to achieve a relative humidity of 18.8%, left for 24 hours and re-weighed.

(v) The samples were run in triplicate at each humidity level.

The following formula was used to calculate the % moisture uptake by the sample:

$$\% \text{ Moisture Uptake} = \frac{W_B - W_A}{W_A} \times 100$$

where $W_A$ = initial mass of sample $\times \dfrac{\text{total solids}}{100}$ and $W_B$ = final mass of sample.

The results are shown in Table 3.

TABLE 3

| | Sample | | | | | | | | |
|---|---|---|---|---|---|---|---|---|---|
| | Hydrolysed Protein 1 | | | Hydrolysed Protein 2 | | | Pricerine™ 9091 (ex Croda) (Glycerine control) | | |
| Sample number | A | B | C | A | B | C | A | B | C |
| Initial Mass | 1.998 | 2.018 | 2.019 | 2.028 | 2.003 | 2.043 | 2.006 | 2.011 | 2.019 |
| After 50% RH | 0.585 | 0.591 | 0.591 | 0.807 | 0.772 | 0.849 | 0.410 | 0.410 | 0.415 |
| After 18.8% RH | 0.543 | 0.549 | 0.550 | 0.694 | 0.685 | 0.695 | 0.339 | 0.339 | 0.340 |
| $W_A$ | 0.290 | 0.293 | 0.293 | 0.294 | 0.290 | 0.296 | 0.291 | 0.292 | 0.293 |
| $W_B$ (50%) | 0.585 | 0.591 | 0.591 | 0.807 | 0.772 | 0.849 | 0.410 | 0.410 | 0.415 |
| $W_B$ (18.8%) | 0.543 | 0.549 | 0.550 | 0.694 | 0.685 | 0.695 | 0.339 | 0.339 | 0.340 |
| % Moisture Uptake (50%) | 101.995 | 102.072 | 101.914 | 174.264 | 165.869 | 186.428 | 41.081 | 40.723 | 41.880 |
| % Moisture Uptake (18.8%) | 87.429 | 87.619 | 87.877 | 135.870 | 135.877 | 134.611 | 16.530 | 16.406 | 16.190 |

As can be seen from Table 3, hydrolysed proteins 1 and 2 have significantly improved moisture uptake from the air when compared to the glycerine control. By treating the surface with hydrolysed protein, the moisture uptake was at least 87% which provided at least a 5 fold increase in the amount of moisture uptake compared to the control.

4. Conditioning Effect

Aqueous solutions of soil treatment compositions of the present invention were applied to the soil.

Soil treatment composition A comprises a ten fold aqueous dilution of soil treatment composition concentrate comprising 10% hydrolysed wheat protein; 6.25% (EO/PO) block copolymer; 6.25% PEG-60 almond triglyceride and PEG-6 capric/caprylic glyceride. The surfactants were applied at a combined concentration of 12,500 ppm and the hydrolysed protein was applied at a concentration of 10,000 ppm.

Soil treatment composition B comprises a ten fold aqueous dilution of soil treatment composition concentrate comprising 2% wheat amino acids, 12.5% (EO/PO) block copolymer and 12.5% PEG-9 laurate. The surfactants were applied at a combined concentration of 25,000 ppm and the hydrolysed protein was applied at a concentration of 2000 ppm.

TABLE 4

| | Wetting Agent Application Rate (ml · ai $m^{-2}$) | Moisturiser Application Rate (ml · ai $m^{-2}$) | Water rate (l $ha^{-1}$) |
|---|---|---|---|
| Composition A (Surfactant 1; Surfactant 3 and Hydrolysed Protein 1) | 1.0 | 0.8 | 800 |
| Composition B (Surfactant 1; Surfactant 2 and Hydrolysed Protein 2) | 2.0 | 0.16 | 800 |

The above examples illustrate the improved properties of the method and composition according to the present invention.

The invention claimed is:

1. A soil treatment composition for wetting and/or conditioning soil comprising:

1,000 to 30,000 ppm of a hydrolysed protein, where the hydrolysed protein comprises an average of 1.5 to 200 amino acids, an ethylene oxide-propylene oxide (EO/PO) block copolymer and/or an alkyl polyglycoside as a surfactant, at least one additional alkoxylate surfactant and water.

2. The composition according to claim 1 wherein the ethylene oxide-propylene oxide (EO/PO) block copolymer has the formula $(EO)_x$-$(PO)_y$-$(EO)_z$ wherein x and z are each independently 1 to 10; and y is 10 to 50.

3. The composition according to claim 2 wherein x and z are 5.5 and y is 33.

4. The composition according to claim 1 wherein the at least one additional alkoxylate surfactant is a fatty acid alkoxylate and/or an alkoxylated glyceride.

5. The composition according to claim 4 wherein the alkoxylated glyceride is PEG-60 triglyceride and/or PEG-6 capric/caprylic glyceride.

6. The composition according to claim 4 wherein the fatty acid alkoxylate is PEG-9 laurate.

7. The composition according to claim 1 wherein the soil treatment composition comprises 3,000 to 30,000 ppm of the ethylene oxide-propylene oxide (EO/PO) oxide block copolymer or alkyl polyglycoside.

8. The composition according to claim 1 wherein said the soil treatment composition comprises 3,000 to 30,000 ppm of the at least one additional alkoxylate surfactant.

9. The composition according to claim 1 wherein the ratio by weight of the total surfactant to the hydrolysed protein is 0.6 to 1.8:1.

10. A soil treatment composition concentrate comprising:
(a) (i) 6 to 13 wt.% of a hydrolysed protein, (ii) 2 to 10 wt. of (EO/PO) block copolymer, (iii) 2 to 10 wt.% of ethoxylated glyceride esters, and (iv) 65 to 90 wt.% of water, where the hydrolysed protein comprises an average of 1.5 to 200 amino acids; or
(b) (i) 1 to 4 wt.%, of a hydrolysed protein, (ii) 5 to 18 wt.% of (EO/PO) block copolymer, (iii) 5 to 18 wt.% of fatty acid ethoxylate, and (iv) 45 to 85 wt.% of water, where the hydrolysed protein comprises an average of 1.5 to 200 amino acids.

* * * * *

UNITED STATES PATENT AND TRADEMARK OFFICE
CERTIFICATE OF CORRECTION

PATENT NO. : 11,060,028 B2
APPLICATION NO. : 16/211394
DATED : July 13, 2021
INVENTOR(S) : Blease et al.

Page 1 of 1

It is certified that error appears in the above-identified patent and that said Letters Patent is hereby corrected as shown below:

In the Claims

Column 10, Line 62 at Claim 8, "The composition according to claim 1 wherein said the" should read --The composition according to claim 1 wherein the--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*